Feb. 11, 1936.   F. D. HARRIS   2,030,789
KEYBOARD CAM
Filed Feb. 21, 1935
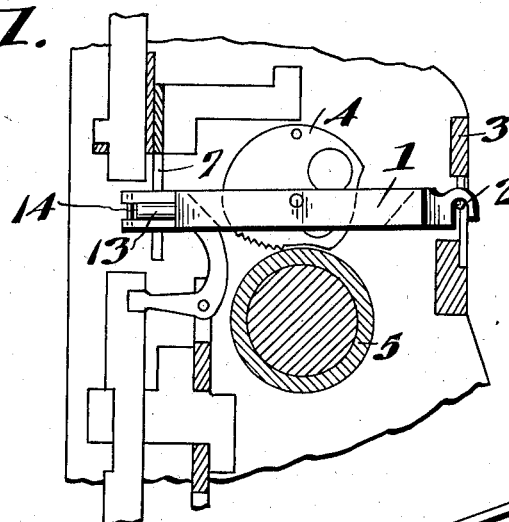
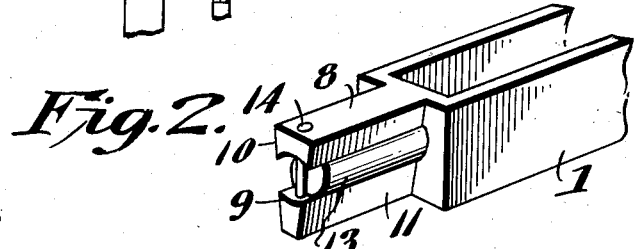
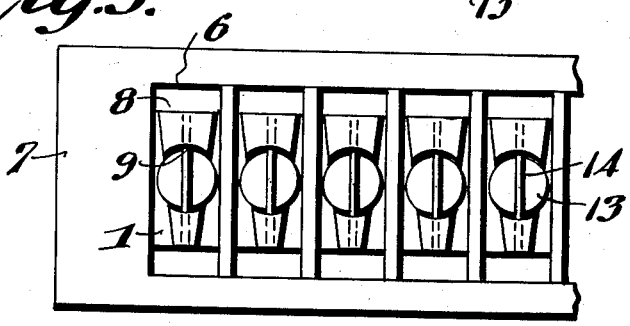
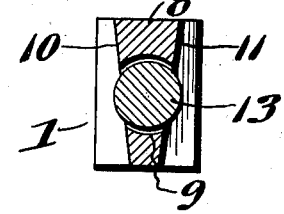
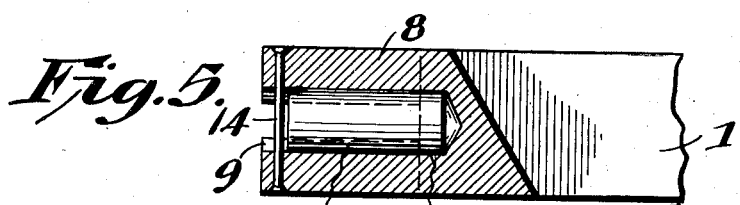
Inventor
F. D. Harris
By Lloyd W. Patch
Attorney Patented Feb. 11, 1936

2,030,789

UNITED STATES PATENT OFFICE 2,030,789

KEYBOARD CAM

Frederick D. Harris, Miami, Fla.

Application February 21, 1935, Serial No. 7,653

8 Claims. (Cl. 308—6)

My invention relates to improvements in keyboard cams as used on linotype and intertype, and other line composing and casting machines, and particularly to an antifriction and non-clogging or sticking bearing structure as applied to the cam arm.

An object of my invention is to provide a device of this character with which the cam arm or yoke will readily slide and move within guideways of the cam frame, and with which the cam arm will drop more readily and more quickly.

Another object is to so construct the arm as to prevent sticking or jamming of the parts within the cam frame, and to yet permit interchanging and installation of my improved structure to take the place of cam arms as now used, and to function and operate with the standard or usual parts of the machine.

Still another purpose of my invention is to provide a device of this character which is of simple and inexpensive construction and which can be readily manufactured and placed in use, and which will shortly compensate for costs of replacement by elimination of sticking and saving of time now required for resurfacing and readjustments of the cam arms as at present in use.

With the above and other objects in view, which will be apparent to those skilled in the art, my invention includes certain novel features of construction and combinations and arrangements of parts which will be hereinafter more fully set forth in connection with the drawing and then pointed out in the claims.

In the drawing:

Figure 1 is a sectional view through a part of a machine showing my improved structure as it will be applied in use.

Fig. 2 is a fragmentary perspective view of the bearing end of the cam arm or yoke.

Fig. 3 is a view in elevation looking at the back side of a cam frame and showing the fitting of my improved cam arm therein.

Fig. 4 is a sectional view taken transversely through the bearing end of the cam arm.

Fig. 5 is a longitudinal fragmentary sectional view through the bearing end of the cam arm.

In the adaptation and use illustrated in Figure 1, the cam arm or yoke 1 is carried at one end by the fulcrum or bearing 2 of the cam holder 3, and the cam 4 is thus disposed in proper operative relation with respect to the keyboard roll 5. The remaining end of the arm or yoke 1 is fitted in the guide slot 6, of the usual cam frame 7, and in fact the general shape and form of the cam arm of yoke 1, and the construction, arrangement and assembly of the other parts of the machine, can be as now employed and embodied in such machines.

Primarily, my invention is embodied in the bearing end 8 of the cam arm or yoke 1, where this is fitted to move within the guide slot or way 6 of the cam frame 7. It is necessary that the cam arms or frames be held and guided within these slots or ways 6 so that the arms or yokes 1 will not twist or swing laterally from the substantially vertical plane in which they work, and at the present time it is the practice to make the bearing end 8 substantially rectangular in its general outline when viewed in end elevation. While this substantially rectangular form is efficient in retaining the cam arm or yoke against twisting and diagonal misalignment, it has been found that the bearing ends will jam and stick within the guideways 6, and attempts have been made to overcome such sticking by recessing or cutting away the middle portion of the bearing part on each side to thus reduce the bearing contact. While this helps to some extent, the present type of bearing still becomes clogged and jams or sticks within the guideway, requiring resurfacing, cleaning, readjustment, and the like.

With my improved structure, this extending bearing end portion 8 is made of a width at its top to fit and properly guide within the guide ways or slots 6, and from the top face the two lateral side faces are tapered inwardly so that the end portion 8 presents in end elevation a shape corresponding substantially to a long keystone, or to a square nosed wedge. The purpose of this tapering is to provide such clearance on the lateral faces of the bearing portion 8 that contact thereof with the sides of the guideways of slots 6 is prevented, and yet the portion of this bearing end 8 adjacent to the upper face is sufficiently wide to fit and guide within the slots or guideways 6.

In this tapered form, the bearing portion of the cam arm or yoke might move with the proper speed and freedom, but the tapered formation will permit and allow diagonal twisting movement to disalign the parts. A bearing opening 9 is drilled or is otherwise formed in the bearing end 8 preferably substantially in the middle thereof and extending in line with the length of the cam or yoke 1, and this bearing opening is made of sufficiently large diameter that it cuts through the tapered sides 10 and 11 of the bearing portion 8. It is perhaps preferable and desirable that the bearing opening 9 be extended into the solid end portion of the cam arm or yoke 1 to thus give a full and complete recess, as at 12, and a bearing roller 13 is mounted for free revoluble movement within the bearing opening and recess thus provided at 9 and 12.

This bearing roller 13 is preferably of a diameter approximating the width of the top face of the bearing extension 8, and thus an antifriction bearing extension is provided on each side of the tapered lower portion of this receiving end 8. In the present instance I have shown a pin 14 mounted across the outer end of the bearing opening 9 to retain the roller 13 in place, but other stop or retaining means might be employed.

In use, the bearing yokes or arms, and the associated parts, will be assembled in the usual manner and the receiving ends 8 of the cam arms or yokes will be movably received in the guideways or slots 6 of the cam frame 7. The broad flat top face of the bearing extension 8 maintains a sufficient width for the verge rod to rest upon in lifting, and the other portions of the mechanism can function and operate in the usual manner. The antifriction rollers 13 serve as the main contact between the cam arms or yokes 1 and the sides of the guideways or slots 6, and thus friction is reduced to a minimum so that the cam arms will drop and rise and will move within the slots or guideways 6 freely, without sticking or clogging, and at such speeds as to accommodate and match the most rapid operation of the machine. The widened top portions may also serve and function to prevent lateral twisting of the cam arms or yokes 1, but due to the tapered formation of the lateral sides 10 and 11 there will not be any lateral contact to cause sticking, binding or other interference with free and ready movement of the bearing ends of the cam arms or yokes, it being the intention and purpose that the roller shall be the bearing part contacting the sides of the cam frame.

From the foregoing it will be seen that I have provided a bearing structure which provides for and insures quicker dropping of the cam arm or yoke, and which positively prevents and precludes the possibility of the bearing end becoming stuck, clogged or jammed within the slot of the cam frame. As the roller 13 is fitted and held securely and permanently within the bearing end of the cam arm or yoke, it becomes a part thereof, and in consequence there is no possibility of misalignment, misplacement, or damage to these parts in installation or removal of the arms or yokes, and while the machine is in use. Not only will this antifriction bearing structure permit more rapid and positive operation of the parts, but it also prevents sticking and clogging of the bearing ends, thus eliminating the necessity for recessing, readjustment, and replacement of parts as now often required.

While I have herein shown and described only certain specific embodiments of my invention, and have suggested only certain possible modifications, it will be appreciated that many changes and variations can be made in the form, construction, arrangement and assembly of the parts, and in the manner of use, without departing from the spirit and scope of my invention.

I claim:

1. A cam arm bearing comprising an elongated bearing extension having its side faces tapered, said bearing extension being provided with a recess extending longitudinally in the middle portion thereof, and an antifriction roller revolubly mounted in the recess and having its sides extending beyond the tapered faces a distance corresponding substantially to the width of the widest portion of the bearing extension.

2. A cam arm bearing comprising an elongated bearing extension having its side faces tapered said bearing extension being provided with a recess extending longitudinally in the middle portion thereof, an antifriction roller revolubly mounted in the recess and having its sides extending beyond the tapered faces a distance corresponding substantially to the width of the widest portion of the bearing extension, and means to retain said roller within the recess.

3. A keyboard cam arm bearing comprising an elongated bearing extension having its side faces tapered inwardly from the top to present a blunt wedge shape in end elevation, said bearing extension being provided with a bearing recess extending longitudinally in the middle portion thereof and opening through the tapered faces, and an antifriction roller revolubly mounted in the recess and having its sides extending through the openings of the tapered faces, said roller being of a diameter corresponding substantially to the widest portion of the bearing extension.

4. A keyboard cam arm bearing comprising an elongated bearing extension having its side faces tapered inwardly from the top to present a blunt wedge shape in end elevation, said bearing extension being provided with a bearing recess extending longitudinally in the middle portion thereof and opening through the tapered faces, an antifriction roller revolubly mounted in the recess and having its sides extending through the openings of the tapered faces, said roller being of a diameter corresponding substantially to the widest portion of the bearing extension, and means to retain said roller within the recess.

5. A keyboard cam arm bearing comprising an elongated bearing extension having its side faces tapered inwardly from the top to present a blunt wedge shape in end elevation, said bearing extension being provided with a bearing recess extending longitudinally in the middle portion thereof into the arm and opening laterally through the tapered faces of the extension, and an antifriction roller revolubly mounted in the recess and having its sides extending through the openings and beyond the sides of the tapered faces, said roller being of a diameter corresponding substantially to the widest portion of the bearing extension.

6. A keyboard cam arm bearing comprising an elongated bearing extension having its side faces tapered inwardly from the top to present a blunt wedge shape in end elevation, said bearing extension being provided with a bearing recess extending longitudinally in the middle portion thereof into the arm and opening laterally through the tapered faces of the extension, an antifriction roller revolubly mounted in the recess and having its sides extending through the openings and beyond the sides of the tapered faces, said roller being of a diameter corresponding substantially to the widest portion of the bearing extension, and means to retain said roller within the recess.

7. A cam arm bearing comprising an elongated bearing extension having its side faces tapered inwardly from the top, said bearing extension being provided with a recess extending longitudinally in the middle portion thereof, an antifriction roller revolubly mounted in the recess and having its sides extending beyond the tapered faces, said roller being of a diameter corresponding substantially to the widest portion of the bearing extension, and a pin carried by the bearing extension and disposed across the open end of the recess to retain said roller against displacement.

8. A keyboard cam arm bearing structure comprising, with a cam frame having guide slots therein, a cam arm having an elongated bearing extension thereon, said extension being of a width at its top edge to move freely and yet hold against lateral shifting within the bearing slot and being tapered inwardly from the top face to present a blunt wedge shape in end elevation, said bearing extension being provided with a bearing recess extending longitudinally in the middle portion thereof and opening laterally through the tapered side faces, an antifriction roller revolubly mounted in the recess and having its sides extending laterally through the openings and beyond the sides of the tapered faces to a width corresponding substantially to a width to travel freely without side play within the bearing slot of the cam frame, and means to hold said antifriction roller against displacement from the bearing recess.

FREDERICK D. HARRIS.